May 11, 1943.　　　　J. K. POLHEMUS　　　　2,319,157
SHUTTER RELEASE FOR FOLDING CAMERAS
Filed May 7, 1941
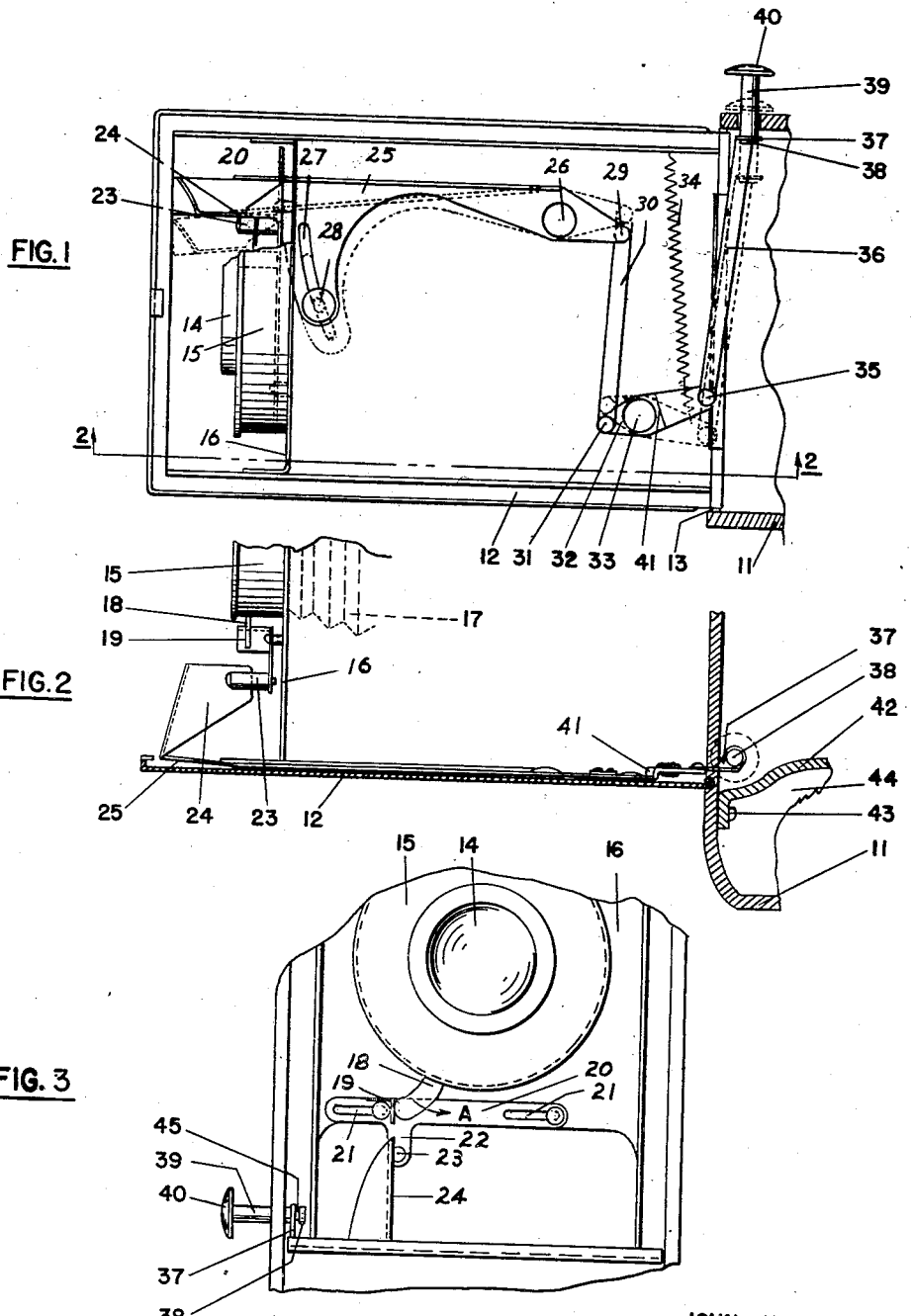
JOHN K. POLHEMUS
INVENTOR
BY
ATTORNEYS Patented May 11, 1943

2,319,157

UNITED STATES PATENT OFFICE 2,319,157

SHUTTER RELEASE FOR FOLDING CAMERAS

John K. Polhemus, Binghamton, N. Y., assignor to General Aniline & Film Corporation, New York, N. Y., a corporation of Delaware Application May 7, 1941, Serial No. 392,244

5 Claims. (Cl. 95—53)

The present invention involves a body shutter release for folding cameras.

Various folding camera constructions have been proposed in the past which include a shutter release member on the camera body and certain mechanical linkages between said body release member and the shutter itself at the front of the usual camera bed. Many of these prior linkages are bulky in construction and require that a slide be mounted inside the camera body. It is difficult in many cases to mount such a slide without increasing the possibility of light leakage into the spool or exposure chambers. The parts of the linkage previously mounted on the usual folding bed of these cameras were large and of poor mechanical efficiency.

With these defects of the prior art in view, it is one object of the present invention to provide an improved body release linkage for folding cameras which will include a minimum of parts on the camera body.

Another object is to provide such linkage which will require very little space on the camera body and folding bed.

A further object is to provide a single operating member mounted on the wall of the camera body and connected directly to the linkage on the camera bed by a single floating link.

Still another object of the invention is to provide a direct connection between the bed linkage and the operating member on the body which shall connect these parts at all times and which shall be pivoted to each of said parts for movement around axes perpendicular to each other to permit folding of the bed without disengagement of the parts.

Other objects and advantages will appear from the following description.

To accomplish the foregoing objects I have invented a new body shutter release construction, one form of which is illustrated in the attached drawing forming a part of this application and in which:

Figure 1 is a partial top view of a camera provided with a body shutter release according to the invention, the camera bed being open and the camera bellows, front supporting mechanism and portions of the camera being omitted for the sake of clarity;

Figure 2 is a view, partly in section, taken on line 2—2 of Figure 1; and

Figure 3 is a partial front view of the construction shown in the previous figures.

In order that those persons skilled in the art may fully understand the nature and scope of the present invention, I shall now give a detailed description thereof with particular reference to the drawing, wherein like reference characters indicate like parts.

In Figures 1 and 2 the camera body 11 is provided with a movable bed 12 hinged to the body at 13. It will be understood that the bed is movable between open and closed positions with respect to the body.

The camera objective lens 14 and camera shutter casing 15 are mounted on the camera front plate or member 16 which is also movable between extended and retracted positions with respect to the camera body. The supporting links for the camera front 16 are not shown in the drawing since they form no part of the present invention. In the preferred form of the invention, the camera front is of the "self-erecting" type which is automatically extended and retracted when the camera bed is opened and closed. Suitable mechanism for such extension and retraction will be seen for example in U. S. Patents 1,793,925, Goldhammer; 2,005,820, Bornmann et al.; and 2,097,197, Lessler.

As shown in Figure 2 in dotted outline, the lens, shutter and camera front are connected to the camera by the customary bellows 17.

The shutter mechanism contained within the shutter casing 15 is provided with the usual shutter trigger 18 which in the present case extends downwardly from the shutter casing as shown in Figures 2 and 3. Trigger 18 is moved in the direction of arrow A in Figure 3 to operate the shutter. To accomplish this movement of the trigger, I have provided a slide 20 mounted on the front plate 16 by pin and slot connections 21. As will be seen from the drawing, this slide is movable laterally with reference to the optical axis of the camera. Slide 20 is provided with an outwardly projecting arm or flange 19 which engages the shutter trigger 18 to operate the shutter when the slide is moved from left to right with reference to Figure 3. Slide 20 is also provided with a downwardly projecting arm 22 on which is mounted a pin 23 to be engaged by the shutter release linkage described below.

The above mentioned operating parts, since they are mounted on the movable camera front, will be extended and retracted with the camera front and will be positioned adjacent or above the end of the camera bed only when the bed is opened and the camera front extended.

Pin 23 of slide 20 is engaged by an upstanding arm 24 connected to one end of a lever 25 pivoted to the camera bed at 26 for rotation about an axis perpendicular to said bed. Lever 25 is provided with a slot 27 which in turn engages a stationary pin or lug 28 on the camera bed as shown in Figure 1 to guide and limit the movement of the lever. In Figure 1, rotation of lever 25 in a counter-clockwise direction will cause arm 24 to engage pin 23 of slide 20 and actuate the shutter.

Lever 25 has an arm extending beyond pivot 26 toward the camera body and to this arm is pivoted at 29 a connecting rod 30. Rod 30 in turn is pivoted at 31 to the outer end of another lever 32 pivoted to the camera bed at 33 and also rotatable about an axis perpendicular to the camera bed. To the opposite or inner end of lever 32 is pivoted a return spring 34 which normally urges said lever in a counter-clockwise direction with reference to the figure and thereby tends to hold arm 25 in its inoperative position.

The inner end of lever 32 may be offset slightly as shown at 41 (Figure 2). The extreme inner end of said lever is positioned close to the camera bed hinge and is movable substantially along said hinge. To this inner end of lever 32 is pivoted at 35 a single floating link 36. Pivot 35 is so arranged that link 36 and lever 32 are relatively movable with respect to each other around an axis perpendicular to the camera bed.

The other end of floating link 36 is provided with an upturned flange 37 pivotally mounted on the inner end 38 of the body release member 39. The portion of said inner end which is engaged by flange 37 is of reduced diameter as shown at 45 in Figure 3, so that flange 37 fits relatively loosely on said portion. Member 39 carries the usual button 40 at its outer end for engagement by the fingers of the operator. Operating member 39 is mounted in a side wall of the camera close to the camera bed hinge and is movable parallel to said hinge. It will be apparent that floating link 36 is pivoted to member 39 by a so-called "knuckle joint" so that said link is rotatable with reference to member 39 about an axis parallel to the camera bed hinge and substantially perpendicular to the axis of pivot 35. At the same time the loose mounting of flange 37 on portion 45 permits limited play between these parts in other directions. Thus the use of relatively perpendicular axes of rotation between link 36 and members 32 and 39 respectively and the use of the loose knuckle joint make it possible for the camera bed to be opened and closed without disengagement of any of these parts and without interfering in any way with the operation of the shutter release mechanism.

It will be understood, of course, that during opening and closing of the bed, most of the relative movement among members 32, 36, and 39 will take place at pivot 38. On the other hand, during operation of the shutter, most of the relative rotation will occur at point 35.

In many typical forms of camera body construction, inner walls 42 (Figure 2) are provided to form an exposure chamber within the camera body and to separate said exposure chamber from the adjacent spool chambers 44. In Figure 2 this wall 42 is joined to the front of the camera body by any suitable means as shown at 43. In previous forms of shutter release mechanism, it has been customary to mount a slide on this wall member 42. The mounting of such a slide increased the possibility of light leakage into the spool chambers 44. In the present construction, however, it will be seen that the release member 39 is mounted only in a side wall of the camera body and extends into the camera body a very short distance. It is therefore unnecessary to provide a slide connection between this member 39 and the inner wall 42. Thus the present construction provides a minimum number of parts mounted within the camera body and decreases the possibility of light leakage to the interior of the camera.

Since levers 25, 30 and 32 are movable around axes perpendicular to the camera bed or, in other words, substantially in the plane of said bed, it will be clear that these levers are very compact in nature and do not project substantially above the camera bed to interfere with extension or retraction of the camera front 16. This elimination of the bulky constructions previously used will be especially apparent from Figure 2.

From the foregoing description it will be understood that I have provided a new and very advantageous body shutter release construction for folding cameras. Since equivalent forms of construction will be readily apparent to those persons skilled in the art, it is not my intention to limit the present invention to the exact construction of the drawing but only to such constructions as are within the spirit and scope of the attached claims.

Now therefore I claim:

1. A folding camera having a body, a bed hinged to said body for movement between open and closed positions, a camera front and lens movable between a retracted position when said bed is closed and an extended picture-taking position near the front of said bed when the bed is open, a shutter and shutter operating lever on said camera front, an actuating linkage mounted on said bed and operably engaging said shutter operating lever when the camera front is extended over said bed, a shutter release member mounted in a wall of said body near the camera bed hinge axis and movable parallel to said axis, and a single floating link pivotally connected to said release member and to said actuating linkage for transmission of the movement of the body release member through the actuating linkage to the shutter operating lever.

2. A folding camera having a body, a bed hinged to said body for movement between open and closed positions, a camera front and lens movable between a retracted position when said bed is closed and an extended picture-taking position near the front of said bed when the bed is open, a shutter and shutter operating lever on said camera front, an actuating linkage mounted on said bed and operably engaging said shutter operating lever when the camera front is extended over said bed, a shutter release member mounted in a wall of said body near the camera bed hinge axis and movable parallel to said axis, said release member extending only slightly into said body, and a single floating link pivotally connected to said release member and to said actuating linkage for transmission of the movement of the body release member through the actuating linkage to the shutter operating lever.

3. A folding camera having a body, a bed hinged to said body for movement between open and closed positions, a camera front and lens movable between a retracted position when said bed is closed and an extended picture-taking position near the front of said bed when the bed is open, a shutter and shutter operating lever on said camera front, an actuating linkage mounted on said bed and operably engaging said shutter operating lever when the camera front is extended over said bed, a shutter release member mounted in a wall of said body near the camera bed hinge axis and movable parallel to said axis, and a single floating link pivotally connected to said release member and to said actuating linkage for transmission of the movement of the body release member through the actuating linkage to the shutter operating lever, the pivotal axes of the connecting link on the body release and on the actuating linkage being substantially perpendicular to each other.

4. A folding camera having a body, a bed hinged to said body for movement between open and closed positions, a camera front and lens movable between a retracted position when said bed is closed and an extended picture-taking position near the front of said bed when the bed is open, a shutter and shutter operating member on said camera front, an actuating linkage mounted on said bed and operably engaging said shutter operating member when the camera front is extended over said bed, a shutter release member mounted in a wall of said body near the camera bed hinge axis and movable parallel to said axis, and a single floating link pivotally connected to said shutter release member and to said actuating linkage for transmission of the movement of the body release member through the actuating linkage to the shutter operating lever.

5. A folding camera having a body, a bed hinged to said body for movement between open and closed positions, a camera front and lens movable between a retracted position when said bed is closed and an extended picture-taking position near the front of said bed when the bed is open, a shutter and shutter operating member on said camera front, an actuating linkage mounted on said bed and operably engaging said shutter operating member when the camera front is extended over said bed, a shutter release member mounted in a wall of said body near the camera bed hinge axis and movable parallel to said axis, and a single floating link one end of which is connected to said shutter release member by a knuckle joint having its main axis of rotation substantially parallel to the camera bed hinge, the other end of said link being pivotally connected to said actuating linkage for rotation about an axis substantially perpendicular to said bed, the movement of the shutter release member being transmitted through said link and actuating linkage to said shutter operating member.

JOHN K. POLHEMUS.